Dec. 17, 1940.   E. ORSHANSKY, JR., ET AL   2,225,082
LIQUID CONTROL STRUCTURE
Filed Aug. 27, 1938   2 Sheets—Sheet 1

INVENTORS
Elias Orshansky, Jr.
BY C. Gerhard Moller, 3rd
Duell, Kane and Smoot
ATTORNEYS.

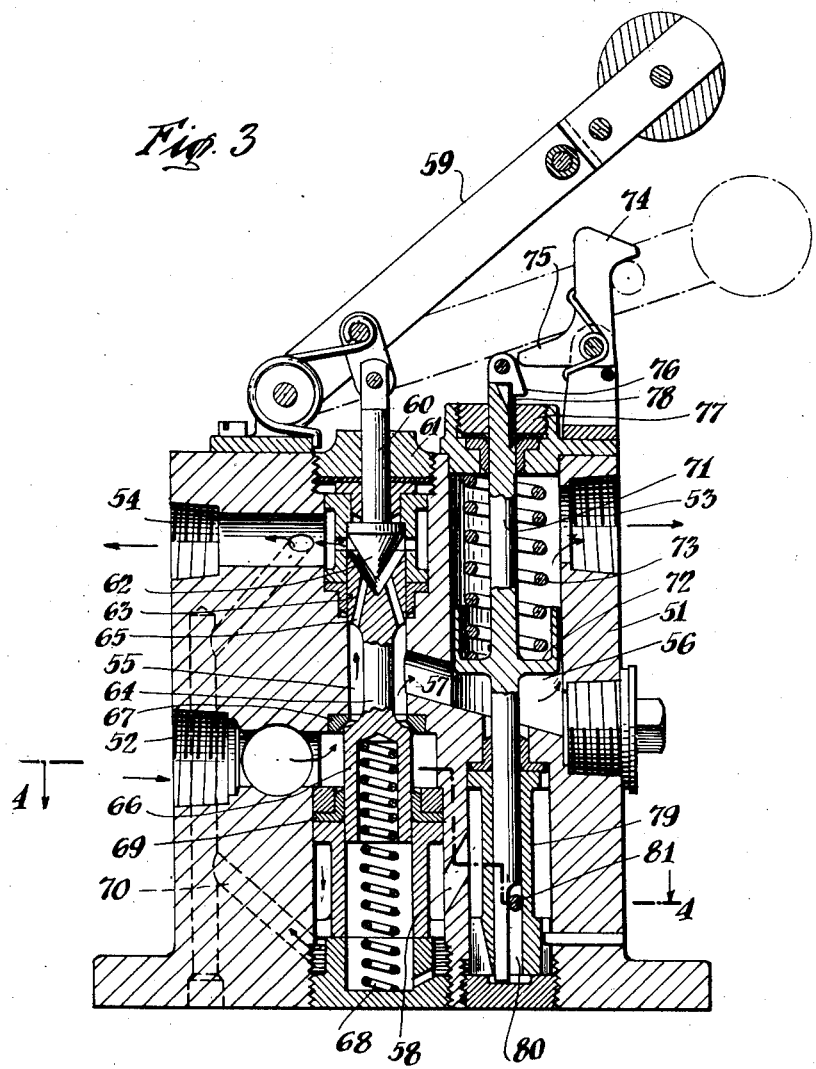
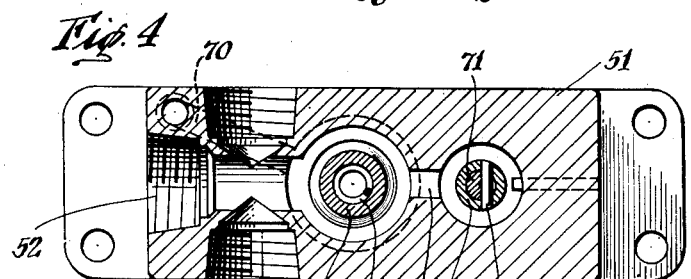

Patented Dec. 17, 1940

2,225,082

UNITED STATES PATENT OFFICE 2,225,082

LIQUID CONTROL STRUCTURE

Elias Orshansky, Jr., Deep River, and Conrad Gerhard Moller, 3rd, New Canaan, Conn., assignors, by mesne assignments, to The Acrotorque Company, New Haven, Conn., a corporation of Connecticut Application August 27, 1938, Serial No. 227,072

13 Claims. (Cl. 137—139)

This invention relates to a functionally and structurally improved control or valve mechanism and in its more specific aspects aims to provide a unit of this type to be primarily employed in connection with liquids under pressure.

It is an object of the invention to provide a unit of this character which is primarily intended to be coupled to a source of liquid under pressure and to a mechanism to be actuated by such liquid, the present control or valve unit serving to couple the source and mechanism until the mechanism has accomplished certain desired results. The present unit serves to either maintain communication for a predetermined interval or permit a given quantity of liquid to pass through it before interrupting the flow of such liquid.

A further object is that of providing a structure of this type and which will be of an entirely dependable character, such that an operator may be assured of a positive function of the parts free from any manual supervision or attention.

Another object is that of constructing a control unit which will occupy relatively little space and yet which will be capable of controlling liquids under relatively high pressures, such control being effected throughout innumerable operations with freedom from all mechanical difficulties.

An additional object is that of devising a unit which will embody relatively few parts, each individually simple and rugged in construction and capable of precision manufacture without undue expense.

With these and other objects in mind, reference is had to the attached sheets of drawings, illustrating practical embodiments of the invention, in which:

Fig. 3 is a view similar to Fig. 1, but showing an alternative form of the invention, and Fig. 4 is a sectional plan view taken along the lines 4—4 and in the direction of the arrows of Fig. 3.

Figure 1:
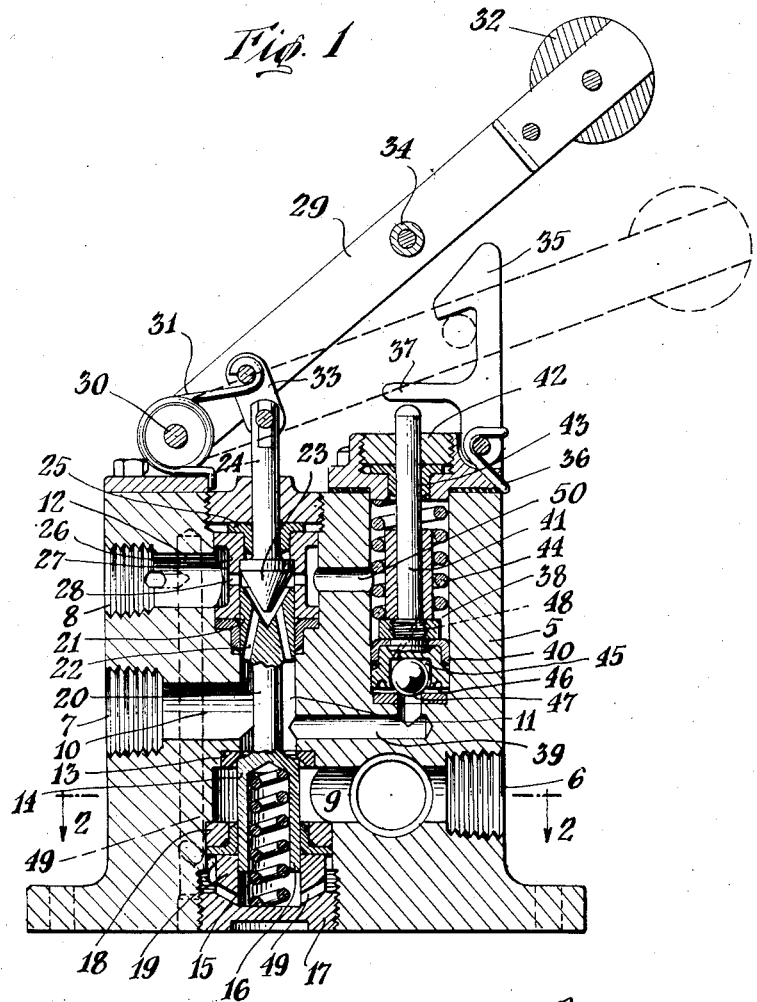
Fig. 1 is a sectional side elevation of one form of valve or control mechanism constructed according to the teachings of this invention.
Figure 2:
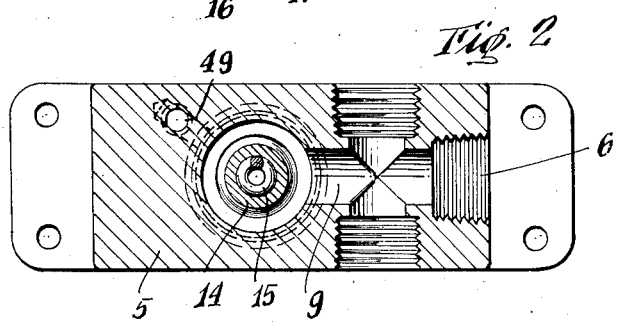
Fig. 2 is a plan view taken along the lines 2—2 and in the direction of the arrows of Fig. 1.

Referring primarily to Figs. 1 and 2, the numeral 5 indicates a body or housing preferably formed of metal. This body has an intake port 6 and main outlet port 7 as well as a discharge port 8. It is intended that port 6 be coupled to a source of fluid under pressure while port 7 is connected to mechanism which is to function in response to fluid pressure. Discharge port 8 may either be coupled so that fluid flowing therefrom is vented to the atmosphere, or else received in a suitable tank.

These several elements have not been illustrated in that they form no part of the invention. Suffice it to say that by means of the present invention a structure is furnished which may be caused to permit a definite flow of fluid and which will interrupt such flow of fluid after the lapse of a predetermined interval. To those skilled in the art, numerous applications of a mechanism of this type will be readily apparent.

Thus, a passage 9 extends from port 6 and a passage 10 from port 7. These passages are connected by a bore 11, the flow of fluid through which is normally interrupted. Also connected to this bore is a passage 12 which is coupled to port 8.

A valve seat 13 is arranged within bore 11 and presents a preferably tapered face against which the edge of a valve body 14 seats to provide a line contact seal. This valve body is normally maintained in bore sealing position by means of a spring 15 disposed within the bore and extending into a countersunk portion 16 of the valve body. It will be observed that the lower edge of the latter is normally spaced from the cap or plug 17 which seals the lower end of the bore 11 and in order to guide the valve 14 in its movements and also to prevent, to a maximum extent, leakage of fluid into the lower portion of the bore, packing elements 18 may be interposed between the face of the bore and the outer face of the valve 14. Moreover, this valve face slidably engages the inner face of a collar or sleeve 19 which may form an integral part of the cap or plug 17.

A stem 20 may be integral with or affixed to the valve body and present adjacent its upper end a valve seat portion 21 formed with bores 22 affording closest communication between the bore 11 and its upper face. A valve 23 preferably of tapered configuration and corresponding contour to the upper face of portion 21 is secured to a stem 24 and projectable thereby into fluid sealing contact with portion 21. This portion, as well as stem 24, is surrounded by packing elements 25 which will reduce leakage to a minimum and also serve as guides to confine the movements of these parts to a path parallel to the axis of bore 11. To further guide valve 23, a bushing or collar 26 encircles the same and is formed with a channel or groove 27 in its outer face, passages 28 being furnished which afford communication between this channel and the bore of collar 26. Now, with a view to shifting the parts aforedescribed, it is preferred to employ a manually actuatable lever 29 which may be pivotally supported as at 30 by the body 5 and it is normally maintained in inoperative or elevated condition by means of a spring 31 or its equivalent. A handle 32 may be furnished adjacent the outer end of this lever and a link 33 may be pivotally connected to both the lever and the upper end of stem 24. In addition, a pin or rod 34 may be carried by the lever, the purpose of this element being hereinafter brought out. It will be obvious, however, that when handle 32 is impressed, stem 24 will be projected. This will cause valve 23 to seat against portion 21, thus closing the passages 22 through the same. Further movement of the handle will cause portion 21 to be retracted within bore 11, thus moving stem 20 in a corresponding direction to unseat valve 14 from its seat 13 and against the action of spring 15. Accordingly, fluid will be free to flow from port 6 to port 7, but incident to spring 15 valve 14 will normally tend to reseat and due to spring 31 valve 23 will likewise tend to unseat.

Now, with a view to controlling the lever 29, it will be observed that a latch 35 is pivotally mounted upon body 5 and a spring 36 tends to normally maintain this position at a point in which it tends to extend into the path of travel of pin 34 to a point where it is depressed. Latch 35 is provided with an extension 37 which, when a thrust is exerted upwardly thereon, will cause the latch to be rocked against the tendency of spring 36 to release the lever 29. In line with the extension 37 body 5 is formed with a further bore 38 which is in communication with bore 11 through a passage 39. Slidably mounted within bore 38 is a piston 40 carrying a pin 41 which projects through an opening in cap 42 closing the bore 38 and which may also be guided by packing 43 to prevent leakage. A spring 44 normally serves to maintain piston 40 in fully projected position in bore 38. Or, in other words, at the lowermost point within said bore the piston is preferably formed with a central recess 45, the outer edges of which are flanged inwardly as at 46 to provide a seat for a bore or similar valve 47, it being noted that a passage 48 extends between the base of this recess and the upper face of the piston.

Finally, it is to be observed that passages 49 may be provided through body 5 and cap 17 to furnish conduits extending beyond the packing 18 and the bore 12 of discharge port 8. It is through these passages that any entrapped liquid may be permitted to escape so as to prevent pocketing and back pressure. Additionally, a passage 50 may be formed through body 5 and to extend between bores 38 and the channel 27 of collar 26 so that bore 38 is also in communication with bore 12.

In operation it will be understood that with port 6 connected to a source of fluid under pressure, lever 29 may be depressed to the position indicated in dotted lines at which point pin 34 will be engaged by latch 35 to retain the lever in that position and to permit an uninterrupted flow of fluid from port 7. Upon this occurring, the fluid will be free to additionally flow through passage 39 and act against the lower face of piston 40. Due to the relatively small amount of exposed area of ball 47, no action will initially occur and the fluid will continue to be disposed from port 7 until a back pressure of proper value exists. Upon the pressure rising to predetermined value, ball 47 will be forced upwardly against the action of the spring and as soon as this occurs the fluid under pressure will be free to act against the relatively large exposed face of piston 40. The latter will accordingly move rapidly upwardly against the action of spring 44 and pin 41 will finally engage extension 37 to rock latch 35 to lever releasing position. When this occurs, the lever will move upwardly incident to the action of springs 15 and 31 and further flow from port 6 to port 7 will be interrupted. At the same time, it is apparent that fluid which has been vented past piston 40 and into bore 38 may freely flow through passage 50 around collar 26 and so to bore 12 and port 8. Likewise, fluid under pressure and which is trapped between the upper face of valve 14 and portion 21, may flow through passages 22 to be discharged through openings 28. Discharge of fluid under pressure and within passage 39 will, of course, be effected in the same manner. Moreover, fluid which has leaked past packing assembly 18 may flow through passage 29 and so to bore 12.

During the flow period the mechanism which is coupled to port 7 will have been actuated. The factor which may govern the operation of the mechanism will accordingly be the functioning of that mechanism so that it completes its operation and back pressure of sufficient value occurs. Obviously, further variation might be effected to some extent by reducing the size of passage 39, or increasing or decreasing the exposed area of the ball valve or its equivalent. The function of passage 48 will be apparent in that any trapped fluid may be vented to the discharge port.

Now referring to the structure shown in Figs. 3 and 4, there is again represented a unit which may be coupled to various types of mechanism with a view to controlling the same. However, this unit is ideally suited for employment in connection with controlling the feathering and unfeathering activity of variable pitch propeller assemblies such as is commonly employed in aeroplanes. According to present day practice, a pressure of approximately six hundred pounds per square inch is utilized for unfeathering the propeller blades, while a pressure of four hundred pounds is employed to feather the same, i. e., bring them to a position at which the leading and trailing edges of the blades extend in a direction substantially parallel to the direction of a flight. A unit shown in such Figs. 3 and 4 will be positive in action and may be relied upon by the pilot to quickly accomplish the desired results and to maintain the parts in any desired position to which they are to be adjusted.

Thus in these views the numeral 51 indicates the body of the mechanism which is formed with an intake port 52 an outlet port 53 and a discharge port 54 intended either to be vented to the atmosphere or to a liquid receiving tank. Body 51 is formed with bores 55 and 56, the former providing communication between ports 52 and 54 and the latter being primarily connected to port 53. A passage 57 provides what might be termed the main connection between these bores, and a second passage 58 affords communication between the lower ends of the same.

A lever 59 is pivotally supported by body 51 and under the urging of a spring or any other suitable expedient normally assumes the position shown in full lines in Fig. 3. This lever is link connected to a stem 60 having slidable contact with a cap 61 closing the upper end of bore 55 and this stem mounts a valve body 62 adjacent its lower end. This body, when projected, seals the seat formed in the upper face of portion 63 mounted by stem 64, it being observed that this portion is formed with passages 65 extending from its upper to its lower face. A valve 66 bears against a seat 67 to provide a line of seal at this point within bore 55 and this valve may be integral with stem 64. A spring 68 normally urges the valve to assume a seated position and guiding and packing portions 69 may be forced to assure a proper movement of the valve.

The lower end of bore 55 is coupled by a passage 70 with outlet port 54 to thus permit of the escape of any entrapped liquid below the packing 69 or within the lower end of bore 56. In this connection it will be apparent that liquid trapped at the latter point may flow through passage 58 to bore 55 and thence to passages 70.

Mounted within bore 56 is a stem 71 to which is secured a piston 72 normally urged to the position shown by means of a spring 73. A latch element 74 is pivotally mounted by body 51 and at a point such that it may cooperate with lever 59 to maintain the same in the position shown in dotted lines in Fig. 3. This latch is spring-pressed and has a heel portion 75 engageable with a latch 76 pivotally mounted adjacent the upper end of stem 71 and at a point beyond that at which it passes through cap 77 which closes the upper end of bore 56. A spring 79 normally urges latch member 76 to assume a position such that with the movement of stem 71 it will engage the heel portion 75 and latch element 74.

Stem 71 is continued into the lower portion of bore 56 and may be enclosed within guiding member and packing 78, it being noted that any leakage of fluid past the packing will result in a flow into the lower part of bore 56, from whence it may escape as aforedescribed.

A portion of rod 71 may be reduced as at 80 so as to slidably engage a pin 81 fixed with respect to the casing 51. As a consequence, the stem will be incapable of turning and latch arrangement 76 will at all times extend in a proper direction.

In operation, assuming that the unit is employed in the association for which it is primarily designed and that it is desired to unfeather the propeller blades, all that the pilot will have to do is depress lever 59 so that it is coupled to latch 74 shown in dotted lines. This movement will cause valve 62 to engage portion 63 and depress stem 64 to unseat valve 66. Accordingly, liquid may flow through port 52 into bore 55 and through passage 57. It is to be understood that piston 72 has a loose fit. For example, a clearance of twenty thousandths of an inch may exist between it and the side walls of bore 56. Accordingly this piston will move upwardly within bore 56 and against the action of spring 73. At the same time a considerable flow of fluid will occur past the piston and through port 53 to actuate the mechanism coupled to that port. As stem 71 moves upwardly latch 76 will ride against heel portion 75 and the stem will continue to rise without causing latch 74 to release lever 59. It is also to be observed that the exposed area of the upper face of piston 72 is equal to the lower area thereof. Accordingly, as soon as sufficient back pressure has been built up at port 53, the liquid will cease flowing from this port and the pressures on both sides of the piston will be equalized. Under the circumstances the spring 73 will move the stem and piston 71 downwardly. In such movement latch 76 will engage heel portion 75 of latch element 74 to thus release the same from engagement with lever 59.

Accordingly the lever will move upwardly to the position shown in full lines and the parts will assume corresponding positions. Liquid under pressure and within that portion of bore 55 between valve 66 and valve portion 63 will be vented through openings 65 to port 54. Likewise, any trapped liquid within the lower portion of ports 56 and 55 may escape through passages 70.

It is thus apparent that a pilot confronted with an emergency requiring a feathering of the propeller blades or otherwise desiring to achieve this result, may accomplish this function by simply depressing lever 59 whereupon he may give his attention to other matters with the full assurance that fluid under pressure will flow from port 52 to port 53 to actuate the mechanism coupled to the latter and that after a sufficient pressure has been built up to achieve the desired result, such flow will be interrupted. While, of course an unfeathering operation may be achieved in any desired manner, it is capable of complete accomplishment by the same unit. Under such circumstances a pilot may accomplish this result by simply maintaining lever 59 in depressed position and regardless of the tendency of latch 74 to release. Under these circumstances fluid under pressure will continue to flow to port 53. However, the apparatus will be potentialized to have its parts shifted to the position shown in full lines in Fig. 3 immediately upon the pilot releasing lever 59. It is to be understood that in this connection latch 74, under the circumstances, will be maintained in lever-releasing position.

Thus, among others, the several objects of the invention as afore noted are achieved. Obviously, numerous changes in construction and rearrangement of the parts may be resorted to without departing from the spirit of the invention as defined by the claims.

What is claimed is:

1. A control including a body formed with inlet and outlet openings and a pair of bores and passages extending between said bores and said openings, a valve slidably mounted within one of said bores and engageable with a seat to prevent a flow of liquid into the other of said bores and through said passages, means connected to said valve for unseating the same, means engageable with said last named means for preventing movement of the latter and to maintain said valve in open position and means disposed within the second of said bores for rendering said last named means inoperative after the rate of flow diminishes below a predetermined minimum.

2. A control including a body formed with inlet and outlet openings and a discharge opening, a valve interposed between said inlet and outlet openings and cooperable with a seat to prevent a flow of fluid from one opening to the other, a sealing portion coupled to and movable with said valve and formed with an opening through its body, such opening affording communication between said outlet opening and said discharge opening, a further valve body normally spaced from and movable into contact with said sealing portion to seal the opening therethrough, means coupled to said further valve to cause the same to engage said portion, and means responsive to a diminishing rate of flow of liquid from said inlet to said outlet opening to move the valve connected to said portion onto its seat so that fluid flow from said inlet to said outlet opening is interrupted.

3. A control including a body formed with inlet and outlet openings and a discharge opening, a valve interposed between said inlet and outlet openings and cooperable with a seat to prevent a flow of fluid from one opening to the other, a sealing portion coupled to and movable with said valve and formed with an opening through its body, such opening affording communication between said outlet opening and said discharge opening, a further valve body normally spaced from and movable into contact with said sealing portion to seal the opening therethrough, means coupled to said further valve to cause the same to engage said portion, means responsive to a diminishing rate of flow of liquid from said inlet to said outlet opening to move the valve connected to said portion onto its seat so that fluid flow from said inlet to said outlet opening is interrupted, and means for normally maintaining said last named valve spaced from said sealing portion.

4. A control including a body formed with inlet and outlet openings and a discharge opening, and passages connecting the same, a valve interposed between said inlet and outlet openings and cooperable with a seat to prevent a flow of fluid from one opening to the other, a sealing portion coupled to said valve and formed with an opening through its body, such opening affording communication between said outlet opening and said discharge opening, a further valve body normally spaced from and movable into contact with said sealing portion to seal the opening therethrough, means coupled to said further valve to cause the same to engage said portion to move the valve connected to said portion to a position such that fluid may flow from said inlet to said outlet opening, said body being formed with a bore, a piston slidable within said bore, said bore being coupled to said passages at a point beyond said first named valve and means controlled by said piston to render said last named means inoperative.

5. A control including a body formed with inlet and outlet openings and a discharge opening, and passages connecting the same, a valve interposed between said inlet and outlet openings and cooperable with a seat to prevent a flow of fluid from one opening to the other, a sealing portion coupled to said valve and formed with an opening through its body, such opening affording communication between said outlet opening and said discharge opening, a further valve body normally spaced from and movable into contact with said sealing portion to seal the opening therethrough, means coupled to said further valve to cause the same to engage said portion to move the valve connected to said portion to a position such that fluid may flow from said inlet to said outlet opening, a latch engageable with said last named means to retain the same against movement, said body being formed with a bore, a piston slidable within said bore, means connected to said piston and engageable with said latch to render the latter inoperative and said bore being connected to a passage within said body at a point beyond said first named valve.

6. A control including a body formed with inlet and outlet openings and a discharge opening, and passages connecting the same, a valve interposed between said inlet and outlet openings and cooperable with a seat to prevent a flow of fluid from one opening to the other, a sealing portion coupled to said valve and formed with an opening through its body, such opening affording communication between said outlet opening and said discharge opening, a further valve body normally spaced from and movable into contact with said sealing portion to seal the opening therethrough, means coupled to said further valve to cause the same to engage said portion to move the valve connected to said portion to a position such that fluid may flow from said inlet to said outlet opening, a latch engageable with said last named means to retain the same against movement, said body being formed with a bore, a piston slidable within said bore, means connected to said piston and engageable with said latch to render the latter inoperative, said piston being formed with a passage, a valve for controlling the flow of liquid to the base of said piston, said piston-receiving bore being connected to said discharge opening and said bore being also connected by a passage within said body to a point beyond said first named valve.

7. A control including a body formed with inlet and outlet openings and a discharge opening together with bores interposed between said openings, a valve positioned within one of said bores and to prevent a flow of fluid from said inlet to said outlet opening, a piston interposed within another of said bores and having a clearance from the same, such that fluid may flow past the same and toward said outlet opening, means for shifting said valve to a positon such that fluid may flow through said bores, a latch engageable with said last named means to maintain the same in the position to which it has been shifted, said piston being coupled to said latch, means for shifting said piston in a direction such that said latch is rendered inoperative and said body being formed with drain passages communicating with said discharge opening.

8. A control including a body formed with inlet and outlet openings and a discharge opening together with bores interposed between said openings, a valve positioned within one of said bores and to prevent a flow of fluid from said inlet to said outlet opening, a piston interposed within another of said bores and having a clearance from the same, such that fluid may flow past the same and toward said outlet opening, means for shifting said valve to a position such that fluid may flow through said bores, a latch engageable with said last named means to maintain the same in the position to which it has been shifted, a latch connected to said piston and engageable with said first named latch without operating the latter as said piston moves in one direction and engaging said first named latch to render the same inoperative as said piston moves in an opposite direction, a spring for normally urging said piston in such latter direction and said body being formed with fluid draining passages connected to said discharge opening.

9. A control for liquids including a body formed with inlet and outlet openings and also a discharge opening, said body being moreover formed with passages and bores interconnecting said openings, a main valve positioned within said body for controlling the flow of liquid from said inlet to said outlet opening, a second valve for controlling the flow of liquid through said bores and passages and from the outlet opening to said discharge opening, means for opening said main valve and simultaneously closing said second valve, means connected to said last named means for maintaining said main valve in open position, and means responsive to a change in the rate of flow of the liquid from said inlet to said outlet opening to cause said main valve to close and prevent further flow from said inlet to said outlet opening and to open said second valve to permit a flow past the same.

10. A control for liquids including a body formed with an inlet opening adapted to be connected to a source of fluid under high and substantially continuous pressure, said body being formed with an outlet opening to be connected to an apparatus which is to be rendered operative upon being substantially charged with liquid under pressure, said body being additionally formed with a discharge opening and with passages connecting all of said openings, a valve within said passages and to control the flow of fluid from the inlet to the outlet opening thereof, means for opening said valve whereby to permit of a flow from the inlet to the outlet opening, means for maintaining said valve in open position, a second valve for controlling the flow of liquid from said passages and outlet opening to the discharge opening, means whereby said second valve prevents any flow of liquid past the same and to said discharge opening, while said maintaining means retains said first named valve in open position, means responsive to a diminution in the rate of flow of liquid from the outlet opening of said body to render said maintaining means inoperative whereby said first named valve will close and means whereby said second valve will substantially, with the closing of the first valve, open to permit a discharge of fluid through said discharge opening.

11. A control for liquids including a body formed with inlet and outlet openings and also a discharge opening, said body being moreover formed with passages and bores interconnecting said openings, a main valve positioned within said body for controlling the flow of liquid from said inlet to said outlet opening, a second valve for controlling the flow of liquid through said bores and passages and from the outlet opening to said discharge opening, means for opening said main valve and simultaneously closing said second valve, means functioning upon a predetermined sequence of events only to automatically close said main valve and open said second valve, said closing means being disposed in advance of said outlet opening and providing a movable flow-obstructing member, the position of which is dependent upon the rate of flow through said inlet opening.

12. A control for liquids including a body formed with inlet and outlet openings and also a discharge opening, said body being moreover formed with passages and bores interconnecting said openings, a main valve positioned within said body for controlling the flow of liquid from said inlet to said outlet opening, a second valve for controlling the flow of liquid through said bores and passages and from the outlet opening to said discharge opening, means for opening said main valve and simultaneously closing said second valve, means connected to said last-named means for maintaining said main valve in open position, means responsive to a change in the rate of flow of the liquid from said inlet to said outlet opening to render said valve maintaining means inoperative and to cause said main valve to prevent further flow from said inlet to said outlet opening and to open said second valve to permit a flow past the same, said flow responsive means including means disposed in advance of said outlet opening and providing a movable flow-obstructing member, the position of which will be dependent upon the rate of flow through said inlet opening.

13. A control including in combination a casing formed with inlet, outlet and discharge openings, and passages interconnecting said openings, means for preventing flow of fluid from said discharge opening, means whereby fluid may flow from said inlet to said outlet opening and means responsive to a sufficient diminution in the volume of such flow per unit of time for preventing further fluid flow through said inlet opening to said outlet opening and connecting said outlet opening with said discharge opening.

ELIAS ORSHANSKY, Jr.
C. GERHARD MOLLER, 3rd.

DISCLAIMER 2,225,082.—*Elias Orshansky, Jr.*, Deep River, and *Conrad Gerhard Moller, 3rd*, New Canaan, Conn. LIQUID CONTROL STRUCTURE. Patent dated December 17, 1940. Disclaimer filed February 3, 1945, by the assignee, *Marquette Metal Products Company*.

Hereby enters this disclaimer to claims 4, 5, and 6 of said patent.

[*Official Gazette March 6, 1945.*]